United States Patent [19]

Layton et al.

[11] 4,273,631

[45] Jun. 16, 1981

[54] PROCESS FOR THE CONTINUOUS RECOVERY OF GOLD AND OTHER METALS FROM SEA WATER

[76] Inventors: Vincent W. Layton, 1306 SW. 6th St., Miami, Fla. 33135; Ernest Mueller, 39 Painter Hill Rd., Woodbury, Conn. 06798

[21] Appl. No.: 48,205

[22] Filed: Jun. 13, 1979

[51] Int. Cl.$^3$ .............................................. C25C 1/20
[52] U.S. Cl. ................................................ 204/109
[58] Field of Search .......................................... 204/109

[56] References Cited
U.S. PATENT DOCUMENTS 4,033,763  7/1977  Markels ................................. 204/109

*Primary Examiner*—R. L. Andrews
*Attorney, Agent, or Firm*—Howard I. Podell

[57] ABSTRACT

A quantity of Gilsonite Asphalt in proportion ranging from one-tenth gram to three grams per gallon of water to be treated is added in finely powdered form to sea water to coagulate plankton containing metals in the water in a coated treating tank. Treated water is then filtered with a microfine electric filter to remove the plankton and gold and other metals from the sea water. The precipitate is dried and then redissolved in a suitable reagent. Gold and other minerals are separated electrolytically. The treated water then can be desalinized in known manner such as by solar distillation.

9 Claims, 2 Drawing Figures

PROCESS FOR THE CONTINUOUS RECOVERY OF GOLD AND OTHER METALS FROM SEA WATER

FIELD OF THE INVENTION

This invention relates generally to a process for the continuous removal of minerals from plankton-containg waters.

DESCRIPTION OF THE PRIOR ART

The prior art, as exemplified by U.S. Pat. Nos. 3,763,049; 2,162,936; 2,839,389; 3,752,745; 3,474,015; 3,476,663; 4,113,467; 2,086,384; and 3,155,454 and British Pat. No. 103,310 is generally illustrative of the pertinent art but the aforementioned patents are non-applicable to the present invention. While the prior art expedients are generally acceptable for their intended purposes only, they have not proven entirely satisfactory in that they are either complex and expensive to manufacture and/or to operate. As a result of the shortcomings of the prior art, typified by the above, there has developed a substantial need for improvement in this field.

U.S. Pat. No. 4,033,763 issued on July 5, 1977 to Markel discloses treatment of waste water containing metal values with bacteria, such as activated sludge, and separating the sludge from the water and incinerating the sludge and steps for recovering of the metals from the ashes of the burned sludge. Markel also cites other U.S. patents which teach other methods of recovery of metal from filtrates of organic matter containing such metal.

The principal object of this invention is to provide a process which is capable of recovering from plankton-containing waters materials such as metallic cations incuding gold which are present only in trace concentrations.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention reside in the addition of one-tenth to three grams per gallon, of water to be treated, of Gilsonite Asphalt in finely powdered form to sea water to coagulate plunkton containing metals in a coated treating tank. Treated water is then filtered with a microfine electric filter to remove gold cations and other cations from the plankton. The precipitate is dried. The precipitate is redissolved in a suitable reagent such as acetic acid or an other organic acid, and gold and other minerals are separated electrolytically. The treated filtered water then can be desalinized in known manner such as by solar distillation.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENTS

Figure 1:
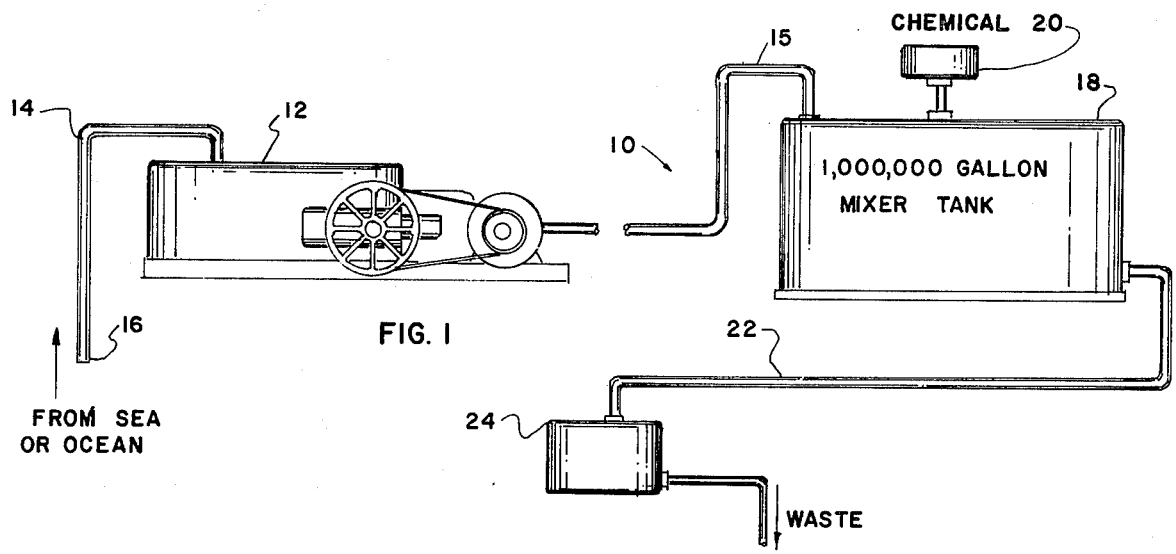
FIG. 1 is a diagrammatic view of one form of apparatus suitable for carrying out the process of the invention.
Figure 2:
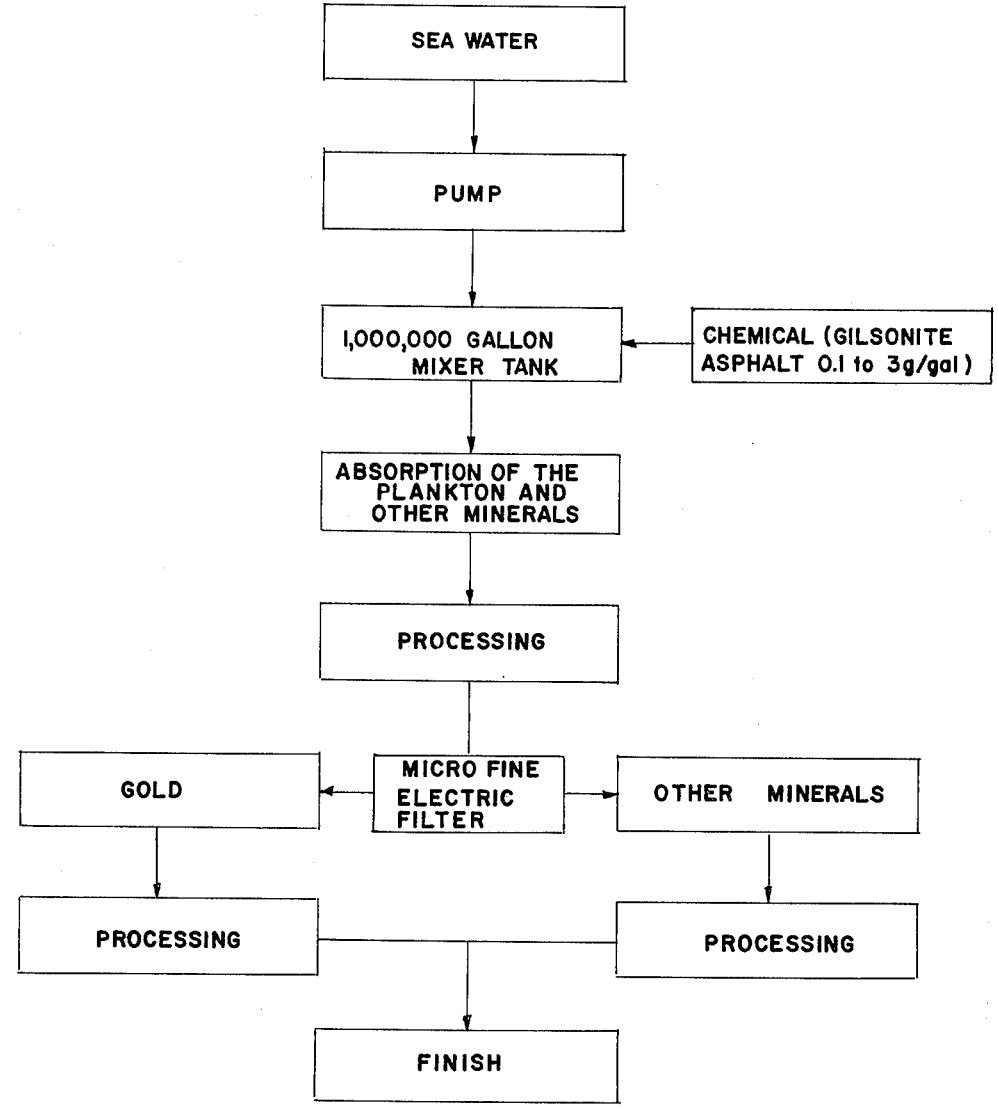
FIG. 2 is a flow diagram showing the essential steps of the process.

With reference to the drawing, there is shown and illustrated apparatus for the recovery of materials from sea water constructed in accordance with the principles of the invention and designated generally by reference character 10. The illustrated tangible embodiment of the invention includes a pump unit 12 which may be of the centrifugal type or other suitable high volume design which has inlet pipe 14 extending to a suitable depth into a body of water containing plankton. Preferably, also the body of water is unadulterated by interfering cations or other pollutants which can destroy plankton or microscopic elements absorbed by the plankton. Plankton selectively absorb gold from their surroundings and contain as much as one-hundred times more gold and other metallic cations than held as salts in the water. Again, location plays an important role in the economics of the present process as waters off the California coast, Central America and Alaska are richer in gold, silver, copper, manganese, palladium, vanadium, platinum and uranium than other waters.

To prevent fouling of inlet pipe 14, the same is capped with a filter screen 16 of relatively thin mesh to bar access to algae, fish and other objects.

As shown in FIG. 1, conduit 15 conveys the sea water into a metal mixing tank 18 of, for example, one-million gallons capacity. Tank 18 is enamel, glass or plastic lined so as to avoid adherence of the extracted minerals to its sides, and to strictly avoid all metallic contact with the water which is to be treated with a special chemical contained in reservoir 20.

This chemical is powdered unsulfonated Gilsonite asphaltum a product of American Gilsonite Company, 36 West 40th Street, New York, N.Y. This product is a purified naturally occurring asphaltum which is soluble in hydrocarbon solvents, is water resistant and is characterized by a high melting point of around three-hundred degrees Fahrenheit which is very high for a natural resin. Unexpectedly and for reasons thus far unknown, said product effects the absorption of plankton having a size of 0.01 to 0.1 millimeter by phsyical and chemical action. The amount of additive used ranges from 0.1 to three grams per gallon of water.

Tank 18 is provided with agitators for mixing the additive with the water. The agitators are periodically stopped to allow for precipitation and coagulation of small particles containing cations of gold and other minerals into larger filterable particles. Next, water and particles are flowed through conduit 22 into a microfine electric filter 24. Suitably, this filter can be a Bird Young rotary filter or centrifugal separators which allows for effective discharge of very thin cakes as described in brochure YUF 101 of the Bird Machine Company, South Walpole, Mass. 02071. Preferably, the filter will be a Bird pannevis horizontal vacuum filter described in brochure BPF 102 and Biss of the same company. Regardless of the filter used, the precipitate is separated and dried. The precipitate is then redissolved in a suitable reagent such as a solution of acetic acid or another suitable organic acid or nitric or carbonic acid. Alternatively the organic acid may be added to the precipitate in the wet state, without reguiring the precipitate to be dried. The gold and other cations which may include silver, copper, manganese, palladium, vanadium, platinum, and uranium depending on the origin of the water treated, are then separated in an electrolytic cell on the basis of their position in the electromotive force (EMP) series.

The filtrate, if desired, can be desalinized using known ION exchange resins or by distillation suitably by solar stills to produce process or potable water.

An advantageous feature of the present process is the high gold recovery possible which is of the order of one milligram of gold per gallon of water treated. This renders the process extremely viable considering the low cost of the Gilsonite asphaltum, and the present price of gold and other minerals.

Alternatively to the above described batch process equipment, the process can also be carried out in continuous equipment in which the seawater is conducted through a series of connected glass tubes into which the asphaltum is added, with the outlet of the glass tubes led to a continuous type filter unit and with the wet precipitate from the filter unit continuously treated with acid and fed into an electrolytic cell for removal of the metals. Alternatively, the separated material recovered from the filter 24 may be treated by other means as cited by Markel in U.S. Pat. No. 4,033,763, such as incineration to recover metal material.

The operation and use of the invention hereinabove described will be evident to those skilled in the art to which it relates from a consideration of the foregoing.

The present invention is believed to accomplish among others all of the objects and advantages herein set forth.

Without further analysis, the foregoing will so fully reveal the gist of this invention that those skilled in the art can by applying current knowledge thereto readily adapt it for various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. A process for recovering gold and trace elements from plankton in plankton-containing water, comprising treating said water with means to cause coagulation and precipitation of plankton containing gold cations and other cations into particles of filterable size, filtering the thus treated water to separate the precipitate from a filtrate, treating the said filtered precipitate so as to cause it to dissolve into a solution adaptable for use with electrolytic separation means and processing the said solution to separate gold and other trace elements from the solution by electrolytic separation means, wherein the means to cause coagulation and precipitation of said plankton is asphaltum that is added to the water.

2. The process of claim 1, wherein said filtering is effected by means of a microfine electric filter.

3. The process of claim 1, wherein said filtering is effected by ultra-centrifuging.

4. The process of claim 1, in which the means to cause precipitation of plankton is asphaltum that is added to water in a proportion ranging from 0.1 gram to 3.0 grams of asphaltum to each gallon of water to be treated.

5. The process of claim 4, in which the asphaltum is Gilsonite asphaltum having a melting point of about threehundred degress Fahrenheit.

6. The process of claim 5, in which the asphaltum is unsulfonated.

7. The process of claim 6, in which the asphaltum is added as a finely powder to the water.

8. The process of claim 1 in which the water treated with means to cause coagulation is housed in hollow container means during said treatment, the interior of which container means is formed with a non-metallic surface.

9. The process of claim 1 in which the treatment for causing the filtered precipitate to dissolve comprises addition of an acid solution to the precipitate.

* * * * *